United States Patent [19]
Seshan et al.

[11] Patent Number: 5,964,825
[45] Date of Patent: Oct. 12, 1999

[54] MANIPULATION OF BOOLEAN VALUES AND CONDITIONAL OPERATION IN A MICROPROCESSOR

[75] Inventors: Nat Seshan, Houston; Laurence Ray Simar, Jr., Richmond, both of Tex.

[73] Assignee: Texas Instruments Incorporated, Dallas, Tex.

[21] Appl. No.: 08/598,775

[22] Filed: Feb. 9, 1996

[51] Int. Cl.$^6$ ...................................................... G06F 7/38
[52] U.S. Cl. ........................................... 708/490; 708/231
[58] Field of Search ............................ 364/716, 716.02, 364/736.01; 340/146.2; 708/525

[56] References Cited

U.S. PATENT DOCUMENTS

| | | | |
|---|---|---|---|
| 3,596,074 | 7/1971 | Mitrofanoff | 364/716 |
| 3,909,789 | 9/1975 | Holtey et al. | 364/716 |
| 4,785,393 | 11/1988 | Chu et al. | 364/716 |
| 5,241,491 | 8/1993 | Carlstedt | 364/716 |
| 5,257,263 | 10/1993 | Bazet et al. | |
| 5,331,664 | 7/1994 | Desperben et al. | |
| 5,331,665 | 7/1994 | Busschaert et al. | |
| 5,398,198 | 3/1995 | Mahant-Shetti et al. | 364/716 |
| 5,485,411 | 1/1996 | Guttag et al. | 364/716 |
| 5,726,923 | 3/1998 | Okumura et al. | 364/715.06 |

OTHER PUBLICATIONS

G. David Forney, Jr., "The Viterbi Algotithm", Proc. IEEE, v,61, No.3, pp. 268–278, Mar. 1973.
Texas Instruments Incorporated, "MicroSPARC Reference Guide, Highly Integrated SPARC for Low–Cost Desktop Solutions", 1992, pp. 1–158.

*Primary Examiner*—Tan V. Mai
*Attorney, Agent, or Firm*—J. Dennis Moore; Wade James Brady, III; Richard L. Donaldson

[57] ABSTRACT

A general purpose microprocessor architecture enabling more efficient computations of a type in which Boolean operations and arithmetic operations conditioned on the results of the Boolean operations are interleaved. The microprocessor is provided with a plurality of general purpose registers ("GPRs" 102) and an arithmetic logic unit ("ALU" 104), capable of performing arithmetic operations and comparison operations. The ALU has a first input (108) and a second input (110), and an output (112), the first and second inputs receiving values stored in the GPRs. The output stores the results of the arithmetic logic unit operations in the GPRs. At least one of the GPRs is capable of receiving directly from the ALU a result of a Boolean operation. In one embodiment, at least one of the GPRs (PN) capable of receiving directly from the ALU a result of a Boolean operation is configured so as to cause the conditioning of an arithmetic operation of the ALU based on the value stored in the GPR.

6 Claims, 3 Drawing Sheets

MANIPULATION OF BOOLEAN VALUES AND CONDITIONAL OPERATION IN A MICROPROCESSOR

TECHNICAL FIELD OF THE INVENTION

This invention relates to apparatus and techniques for manipulation and generation of Boolean values and for conditioning operations in a microprocessor.

BACKGROUND OF THE INVENTION

Microprocessors, such as general purpose microprocessors, digital signal processors, and the like, typically include an arithmetic logic unit ("ALU") and a set of registers, sometimes referred to as general purpose registers ("GPRs"), where the operands to be operated on by the ALU can be accessed by the ALU, either immediately or one or more cycles later, in an ALU operation, and where the results of ALU operations can be immediately stored in an ALU operation.

In addition to the operations of addition and subtraction, ALUs may also have the capability of performing Boolean operations, such as compare, logical OR, bitwise OR, AND, or the like. The results of such operations, Boolean values, are typically stored in a register separate from the GPRs, for example in a status register. However, the Boolean values thus stored are not as accessible to the ALU as values stored in a GPR. In other words, more processor cycles are needed to, for example, to present such Boolean values to the ALU as an input, should it be desired to do so, as compared with presenting a GPR value as an input to the ALU, which is typically done in the same clock cycle in which the ALU operation is performed.

Nonetheless, it has been discovered that in some operations executed in microprocessors processing efficiencies can be realized by the exploitation of certain inventive advances applied to the microprocessor architecture, as disclosed hereinbelow.

One such operation arises in the execution of code implementing convolutional coding. Convolutional coding is a technique that has been used for a number of years, particularly in the form of Viterbi coding, in the area of transmission and reception of digital data. See, for example, *The Principles of Digital Communication and Coding*, by Andrew J. Viterbi and Jim K. Omura, published by McGraw-Hill in 1979, and "The Viterbi Algorithm," by G. David Forney, Jr., *Proc. IEEE*, V. 61, No. 3, pp. 268–278, March 1973. The Viterbi coding technique is widely used as a forward error correction technique for removing noise from digital radio signals.

Basically, convolutional codes are codes generated from a stream of digital data wherein the data is convoluted by being operated on by generator polynomials, the operations being performed modulo 2. Encoding can be regarded as being performed with respect to a finite number of internal states specific to the encoder. These states and the transitions between them can be represented in the form of a trellis. A path within such trellis represents an encoded sequence, analogous to a code word. Encoding a digital bit stream therefore involves crossing the trellis along one possible path, each new bit of the stream of information determining a branch in the path an causing the simultaneous transmission of code bits relating to the path followed.

The code bits are transmitted through a transmission medium to a receiver and an associated decoder. The transmission medium will, in general, have properties such as noise, interference, jamming, etc., that prevent the receiver from receiving the code bits error free. Decoding at the receiving end, therefore, involves taking the received stream of code bits and reconstructing the trellis path taken by the encoder at the transmitting end in generating the code bits, so as to thereby recover the sequence of information bits that caused such path to be selected in the encoding process. This, in turn, involves, first, reconstruction of the trellis, second determination of the lengths of the shortest path to each possible end state in the trellis, third selection of the end state having the shortest such path and, finally, recreating the original data stream from the selected shortest path by the application of a decoding algorithm. The determination of these shortest paths through the trellis is computationally intensive, typically involving the accumulation of possible shortest paths by comparison of lengths of subsets of all paths, and further comparisons of possible shortest paths to narrow down the selection to the final, shortest path.

A number of designs of encoders and decoders based on convolutional codes such as the Viterbi algorithm, that attempt to reduce the computation time have been proposed and implemented. See, for example, U.S. Pat. No. 5,257,263, entitled "Circuit for Decoding Convolutional Codes for Executing the Survivor Path Storage and Reverse Scanning Stage of a Viterbi Algorithm," which issued on Oct. 26, 1993 to Bazet, et al., and which was assigned to Alcatel Transmission Par Faisceaux Hertziens, as well as U.S. Pat. No. 5,331,665, entitled "Decoder Device for Decoding Convolutionally Encoded Message," which issued on Jul. 19, 1994 to Busschaert, et al., and which was assigned to Alcatel N.V.

One disadvantage of such designs is that they typically involve the use of specialized hardware, for example to optimize the shortest path determinations, which is costly. It would be desirable to use, for example, a general purpose microprocessor or digital signal processor, to perform such determinations in Viterbi encoding and/or decoding. On the other hand, it is desirable to perform such determinations without sacrifice of speed, as compared with specialized hardware. attempt to provide a scheme by which a generalized signal processor might be used to process the Viterbi algorithm is disclosed in U.S. Pat. No. 5,331,664, entitled "Device for Processing the Viterbi Algorithm Comprising a Processor and a Dedicated Operator," which issued on Jul. 19, 1994 to Desperben, et al., and which was assigned to Alcatel Radiotelephone. The scheme disclosed in this patent uses a processor and dedicated operator to perform a Viterbi forward pass. It computes and compares the accumulated distances. The bit result of the comparison is then fed into a shift register. However, it has control modules and registers that are separate from the processor. In addition, a bit is shifted in on each compare. For an n-way Viterbi implementation, n-1 compares are necessary. Thus, n-1 bits are produced, which are more bits than it is desired to be generated.

Therefore, it is desired to have a method and apparatus that allows the performance of the Viterbi algorithm on a general purpose digital signal processor that do not suffer from the aforementioned limitations.

Further, it is desired to have a microprocessor architecture that increases the efficiency of the execution of certain operations found, for example, in Viterbi algorithms, involving manipulation of Boolean values.

The present invention provides these benefits.

SUMMARY OF THE INVENTION

The present invention provides a general purpose microprocessor architecture enabling more efficient computations of a type in which Boolean operations and arithmetic operations conditioned on the results of the Boolean operations are interleaved. The microprocessor is provided with a plurality of general purpose registers ("GPRs") and an arithmetic logic unit ("ALU"), capable of performing arithmetic operations and Boolean operations. The ALU has a first input and a second input, and an output, the first and second inputs receiving values stored in the GPRs. The output stores the results of the arithmetic logic unit operations in the GPRs. At least one of the GPRs is capable of receiving directly from the ALU a result of a Boolean operation.

In one embodiment, at least one of the GPRs capable of receiving directly from the ALU a result of a Boolean operation is configured so as to cause the conditioning of an arithmetic operation of the ALU based on the value stored in the GPR.

A method is also provided, performed in a microprocessor having such an architecture, in which a Boolean operation is performed in the ALU to obtain thereby a Boolean value representing the result of the Boolean operation. The Boolean value is stored in a first general purpose register in the same clock cycle as that in which the Boolean operation is performed. Thereafter, an arithmetic operation is performed in the arithmetic logic unit and the result of the arithmetic operation is stored in a second general purpose register. However, the step of performing/storing. is conditioned on the Boolean value stored in the first general purpose register.

These and other features of the invention will be apparent to those skilled in the art from the following detailed description of the invention, taken together with the accompanying drawings.

DESCRIPTION OF THE DRAWINGS AND APPENDICES

Figure 2:
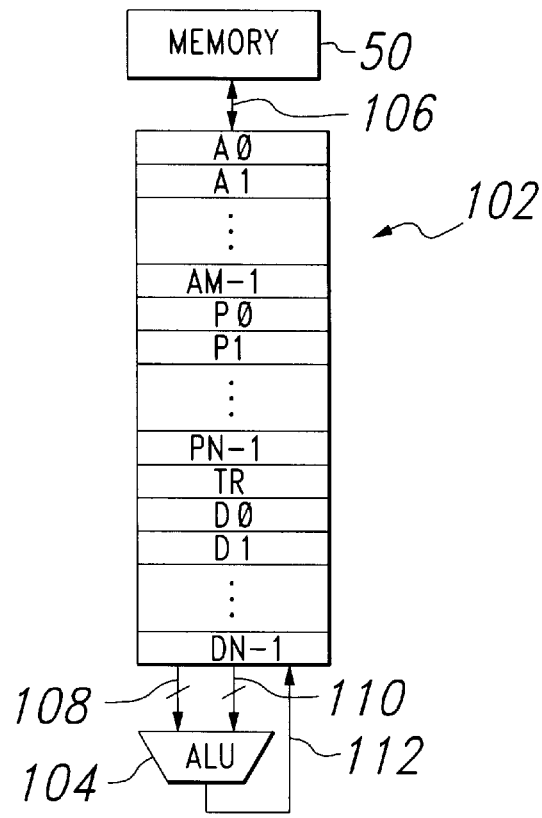
FIG. 2 is a block diagram of a portion of the microprocessor of FIG. 1 showing a register set, ALU and Data.

Appendix 1 is a listing of code that implements a general case "forward pass" through a trellis such as the trellis of FIG. 2;

Appendix 2 is a listing of code that implements a general case "backward pass" through a trellis such as the trellis of FIG. 2;

Appendix 3 is a listing of code that implements a "forward pass" through a trellis such as the trellis of FIG. 2, for a typical implementation;

Appendices 4 and 5 show replacement code for a portion of code shown in Appendix 3;

Appendix 6 is a diagram of the form of result produced by the preferred embodiment of the present invention; and Appendix 7 is a listing of code that implements a general case "backward pass" through a trellis such as the trellis of FIG. 2, however using transitions rather than state numbers.

DETAILED DESCRIPTION OF THE INVENTION

Figure 1:
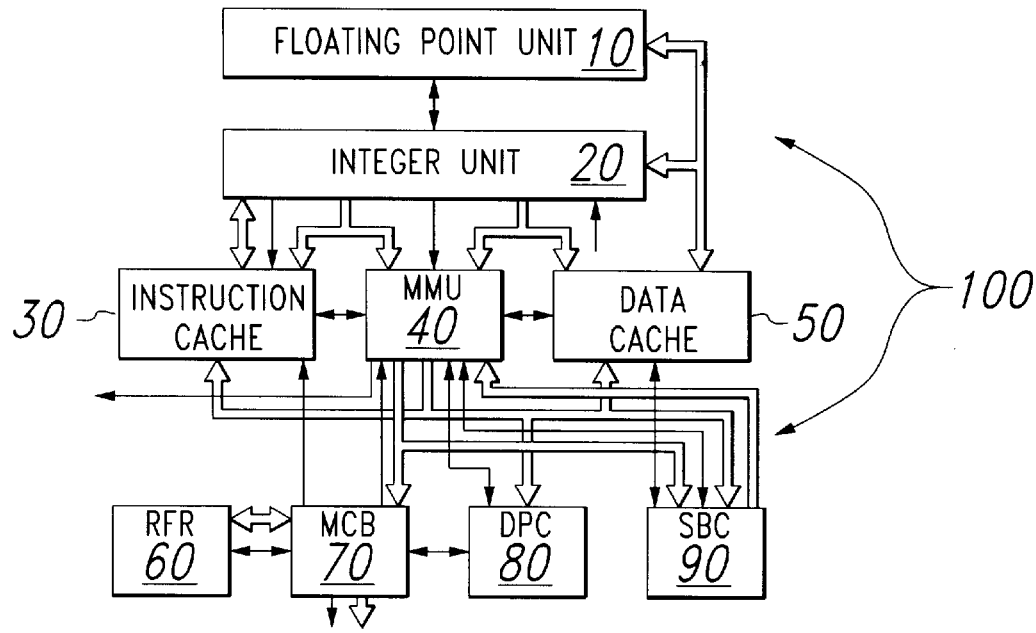
FIG. 1 is a block diagram of a microprocessor.

According to a preferred embodiment of the present invention, a microprocessor architecture is provided including certain advantageous features. FIG. 1 is a high level diagram of an exemplary microprocessor in which the preferred embodiment is presented. For example, the diagram in FIG. 1 may represent a SPARC model TMS39OS10 microSPARC. Such microprocessors are well known and detailed description thereof is not presented herein, in the interests of clarity, except with respect to the portion of such microprocessors where modifications may be made in accordance with the preferred embodiment of the present invention.

Note, generally, however, that the microprocessor consists, generally, of a Floating Point Unit 10 for performing floating point computations, an Integer Unit 20 for performing integer computations, Memory 50, which may include, for example, an instruction cache, memory management unit for performing such functions as translating virtual addresses to physical addresses, memory protection and arbitration between input/output and data cache (not shown), RAM Refresh Control 60, Memory Control Block 70, Data Aligner and Parity Check/generate Logic 80, System Bus Controller 90 and various busses and lines 100 interconnecting those blocks. These functional blocks, and their interconnection are well known. Further detail on the microprocessor shown in FIG. 1, for example, can be found in the TMS390S10 microSPARC Reference Guide, obtainable from Texas Instruments Incorporated. It should be understood that architectural details, such as whether the microprocessor has a cache memory or not, are not essential to the invention. The microprocessor architecture outlined in FIG. 1 is exemplary only.

FIG. 2 is a diagram a portion of a microprocessor such as the microprocessor shown in FIG. 1, however modified in accordance with the preferred embodiment of the present invention. In particular, a portion of the register set found, for example, in the Integer Unit 20 (FIG. 1). Shown are a set of general purpose registers 102, and an arithmetic logic unit 104. The GPRs 102 exchange data with the Memory 50 over a bus 106, while the ALU 104 receives a first input on lines 108 and a second input on lines 110, returning a result value to the GRPs 102 on data bus 112.

The register set 102 includes a subset of registers A0-AM-1, P0 - PN-1, TR and D0- DN-1, as shown. Registers A0-AM-1 are multi-bit registers that are directly loadable to/from the ALU 104, and are used to store accumulation results in computations described in detail hereinbelow in conjunction with Appendices 1–7. Registers P0 - PN-1 are also multi-bit registers that are directly loadable to/from the ALU 104, but in addition one or more bit values therein may condition a WRITE from the ALU 104 to a register in the register set 102. Registers P0 - PN-1 are used to store the results of comparisons in the aforementioned computations. Register TR is a multi-bit register that is directly loadable to/from the ALU 104, and is used to store transition results. Finally, registers D0 - DN-1 are multi-bit registers that are directly loadable to/from the ALU 104, and are used to store distance values.

Note that configurations such as that shown in FIG. 2 may exist in which multiple ALUs are provided, each with its own data bus such as data bus 112. In such case, multiple ports would be required for the registers, such as is discussed below in connection with FIG. 3, for such multiple busses. A single ALU 104 is shown in FIG. 2 for the sake of simplicity of explanation of the functions of the various registers therein.

Figure 3:
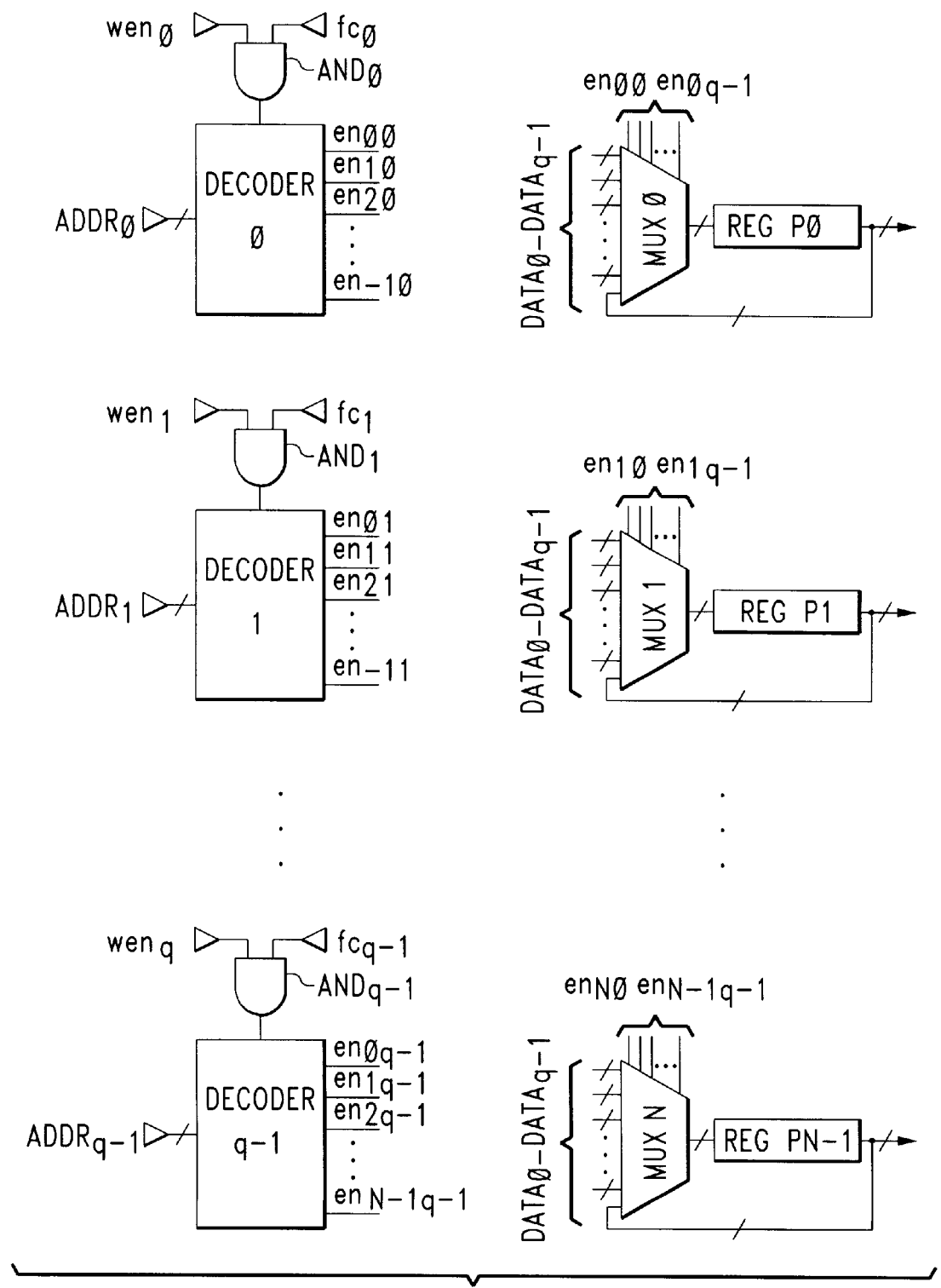
FIG. 3 is a is a detailed circuit diagram of relevant portions of the registers represented in FIG. 2.

FIG. 3 is a detailed diagram of relevant portions of the registers P0 -PN, implementing the preferred embodiment of the present invention. The register set consists of N registers receiving data from q input ports, in this case configured as write address decoders. Each such port receives data from a data bus, such as data bus 112 of FIG. 2. Multiple such data busses would exist in a microprocessor having, e.g., multiple ALUs, each with its own data bus for storing data to the registers. For example, the register set might consist of sixteen registers, each storing thirty two bits from one of six write address decoders. Other numbers and combinations are selectable by the designer according to the particular processor architecture the designer is designing to. Only three of the q write address decoders and three of the N registers are shown, in the interest of clarity. The principles of operation of the write address decoders and registers shown in FIG. 3, explained below, apply similarly to the other write address decoders and registers, and they can be constructed once FIG. 3, as explained below, is understood.

The write address decoders of the registers are implemented in the form of q address decoders, labeled DECODER 0 through DECODER q—1, as shown. Each such address decoder receives as an input a respective address ADDR0 through ADDRq-1. The outputs of two-input AND gates AND0 through ANDq-1 are provided to the enable input of the respective address decoders, DECODER 0 through DECODER q-1, as shown. Each such AND gate AND0 through ANDq-1 receives as inputs a write enable signal wen0 through wenq, respectively, and a functional control signal fc0 through fcq-1, respectively.

The outputs of the address decoders DECODER 0 through DECODER q-1 are enable signals expressed in the form of en(reg#)(port#), where the value, reg# is a number identifying the register to which the data being operated on is to be stored (e.g., reg#=0 means the data is to be stored in register REG P0, reg#=1 means the data is to be stored in register REG P1, and so forth), and where the value port# is a number identifying the port through which the data being operated on is being inputted (e.g., port#=0 means the data is being inputted through DECODER 0, port#=1 means the data is being inputted through DECODER 1, and so forth). Thus, the outputs of DECODER 0 are the signals en00 through enN-10, respectively. The outputs of DECODER 1 are the signals en01 through enN-11, respectively, and so forth, such that the outputs of DECODER q-1 are signals en0q-1 through enN-1q-1, respectively, as shown.

These output signals en00 through enN-1q-1 are provided to the select inputs of N multiplexers MUX 0 through MUX N-1 associated with REG P0 through REG PN-1, respectively, as shown, such that MUX 0 receives enable signals en00 through en0q-1, MUX 1 receives enable signals en1o through en1q-1, and so forth. MUX N-1 receives enable signals enN-10 through enN-1q-1, as shown. The data inputs of the multiplexers MUX 0 through MUX N1 is the data associated with each of the q input ports, namely DATA 0 through DATA q-1, respectively. Note that each of DATA 0 through DATA q-1 is a set of data lines, for example a 32 bit wide data bus. In addition, the data output from the respective register associated with the multiplexer is also provided as an input to the multiplexer, as shown, for operations in which the register value is maintained. The output of each of MUX 0 through MUX N-1 is, likewise, a set of data lines the same number as the input data lines, for example a 32 bit wide data bus, as is the output of each of REG P0 through REG PN-1.

In operation, the addresses ADDR0 through ADDRq-1 at the inputs of the respective input port address decoders DECODER 0 through DECODER q-1, which are register addresses, are decoded and the appropriate enable line en(reg#)(port#), is activated to enable the appropriate multiplexer MUX 0 through MUX N-1 to select the appropriate data DATA 0 through DATA q-1, respectively, for storage in the appropriate register REG P0 through REG PN-1, respectively. Thus, for example, for an operation in which data being inputted from DECODER 1 is intended for storage in register REG P0, the address ADDR1 identifies REG P0 as the target register. Address decoder DECODER 1 decodes address ADDR1 and activates enable line en01, causing multiplexer MUX 0 to select the input DATA 1 for storage into register REG P0.

For the operation just described to occur, the respective address decoder (in the example of the previous paragraph, DECODER 1) must be enabled. The output of the respective AND gate (in the example of the previous paragraph, AND 1) must be active. Thus, for example, for AND gate AND 1 both signals, wen1 and fc1 must be active. The signal wen1 is simply the conventional write enable signal for DECODER 1. The signal fc1, however, is a novel signal used in conjunction of the features of the preferred embodiment of the present invention.

Figure 4:
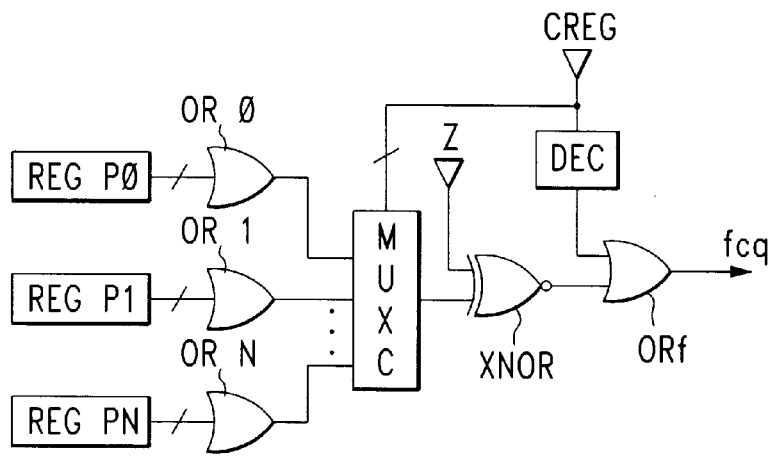
FIG. 4 is detailed circuit diagram showing how certain signals used in the circuit shown in FIG. 3 are generated.

FIG. 4 is a detailed circuit diagram showing how the signals fc0 through fcq-1 are generated. Registers REG P0 through REG PN are shown, with their outputs provided as inputs to OR gates OR 0 through OR N-1, respectively, as shown. Each such OR gate thus provides as an output a signal that is active if any bit value stored in its associated register is a data value of "1". Thus, if any bit in register REG P1 is a data value of "1" the output of OR 1 is a "1", i.e., active. The outputs of OR gates OR 0 through OR N-1 are provided as respective inputs to a multiplexer MUXC. The inputs to MUXC are selected by a set of signals CREG, as will be more fully described below. The selected input is provided to one input of an exclusive OR gate XNOR. The other input of XNOR is a signal z, which will be more fully described below. The output of XNOR is provided to one input of a two-input OR gate ORf, the other input of which is the output of a decoder DEC. Decoder DEC receives as an input the signals CREG, mentioned above. The output of ORf is the signal fcq.

The circuit of FIG. 4 operates as follows. The signals CREG, mentioned above, is a signal representing the identity of the register which contains the condition data to condition the present operation, which we may call the "Condition Register". Recall that the preferred embodiment implements a feature by which one or more bit values in a register may condition a WRITE from the ALU 104 to a register in the register set 102 (FIG. 2). In a typical processor implementation these CREG signals are provided from a field in an instruction register, which stores the current instruction. An example of the contents of such a register is:

| 1 | 3 | 13 | 5 | 5 | 5 | <--number of bits in field |
|---|---|---|---|---|---|---|
| z | CREG | OPCODE | SRC 1 | SRC 2 | DST | <--register contents (fields) | where:
  z selects the "true" condition;
  CREG is the address of the Condition Register;
  OPCODE is the operation code;
  SRC 1 is the source register #1;
  SRC 2 is the source register #2; and
  DST is the address of the destination register.
  OPCODE, SRC 1, SRC 2, and DST are all well known fields, and will not be explained further herein. The bit value "z" selects the "true" condition. Thus, if the condition to be tested is whether the Condition Register contains a "1" in any bit position, then z will be set to a "1". On the other hand, if the condition to be tested is whether the Condition Register contains all "0s", then z will be set to a "0". The value CREG is, as mentioned above, the address of the Condition Register. In this example the value CREG is three bits. This allows for up to eight registers to be configured as Condition Registers. However, it is possible to use three bits for the CREG field and not configure eight registers for use as Condition Registers. For example, only five registers may be so configured. In addition, one value is desirably used to indicate that the current operation is an unconditional operation. An example of a set of CREG values, and their significance is as follows:

| CREG Value | Significance/Condition Register Address |
|---|---|
| 000 | Unconditional operation |
| 001 | REG P0 address |
| 010 | REG P1 address |
| 011 | REG P2 address |
| 100 | REG P3 address |
| 101 | REG P4 address |
| 110 | Reserved |
| 111 | Reserved |

In the above example, the CREG value of "000" is used to indicate that the current operation is an unconditional operation. Five registers, namely, registers REG P0 through REG P4, are configured as Condition Registers. Since only six CREG values are required for the above circumstances, the CREG values of "110" and "111" are reserved for possible later use. The decoder DEC shown in FIG. 4 decodes the CREG value of signals CREG and provides an active output to ORf for the CREG value of "000", i.e., for only unconditional operations in which the operation is not to be blocked. This forces the respective ANDq gate (FIG. 3) to pass the respective wenq enable signal for that operation, regardless of the output of XOR (FIG. 4).

The z signal in FIG. 4 is the value of the z field in the instruction register, and so selects the "true" value conditioning the operation. Thus, when the z signal is active (a "1") XOR outputs a "1" when the output of MUXC is a "1", indicating that a "1" has been found in at least one bit position in the selected Condition Register. Conversely, when the z signal is inactive (a "0") XOR outputs a "1" when the output of MUXC is a "0", indicating that all "0s" have been found in all bit positions in the selected Condition Register. Note that the use of an OR gate in this way represents an implementation that is both simple, economical and effective. It will be appreciated that other implementations could be effected. Thus, only selected bit positions from the register might be provided as inputs to the OR gate. Or, other logic could be substituted for the OR gate, at whatever level of complexity desired to implement the desired condition. Likewise, other implementations are readily conceivable, once the principles presented herein are understood, for alternatives to the XOR gate of FIG. 4. Again, more complex logic could be substituted to allow for more complex conditions for the conditional operation.

Thus it can be seen from the foregoing that the circuits shown in FIGS. 3 and 4 allow the value stored in a register so configured to be used to condition an operation such as a write to a register. It will be appreciated that other operations may be so conditioned as well, such as a read or other memory transaction operation, or an arithmetic operation. It is only necessary to, for example, add an AND gate at the appropriate place in the processor circuitry for such other operation, with an fcq signal as one input, to gate an appropriate enable signal for that operation.

Important benefits arise from the register/ALU configuration shown in FIG. 2 having the advantageous features described in connection with FIGS. 3 and 4. In computations, such as the set of computations described in detail hereinbelow, where ALU operations are conditioned on the Boolean results of previous ALU operations, or on normal ALU operations, are interleaved, the register/ALU configuration having these advantageous features, which is readily adaptable to general purpose microprocessors generally, provides a highly efficient structure for execution. The Boolean operation is performed on values stored in GPRs, and the result is stored immediately to a GPR adapted to condition a subsequent ALU operation on the value stored therein. No cycles are lost transferring Boolean values from, for example, a status register, examining the Boolean value, and then making a conditional operation that depends on such Boolean value. Rather, the Boolean values are available immediately after their generation for such ALU operation conditioning. Furthermore, such Boolean values, stored as they are in a GPR, are also available for immediate use as an arithmetic input to the ALU. Many cycles are saved using this architecture, as compared with prior art general purpose microprocessor architectures, in executing such computations therein. This will be made clear by a detailed examination of a set of computations of the kind discussed above, which is now presented hereinbelow. These computations are of a Viterbi algorithm.

As described in the Forney article cited above, solution of a Viterbi algorithm can be thought of, or modeled, as a process of determining the shortest length path through what the art refers to as a trellis.

1. General Case

Figure 5:
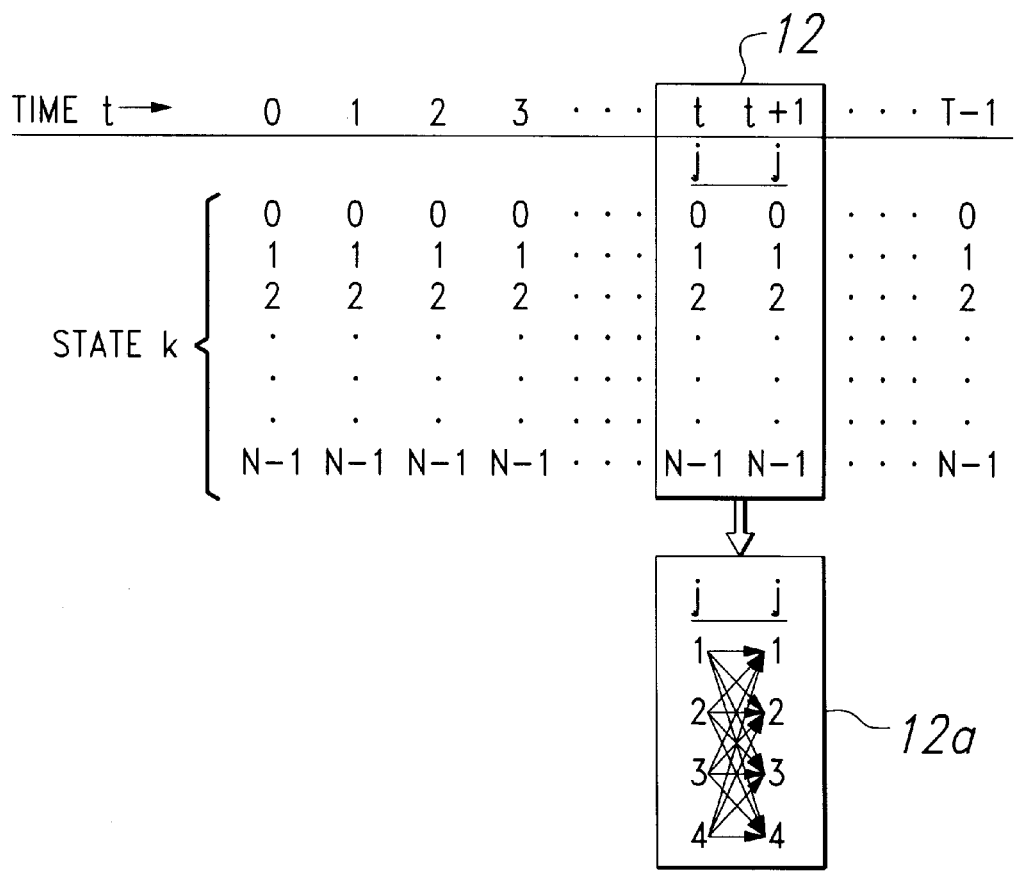
FIG. 5 is a diagram of a trellis used in describing the Viterbi algorithm.

FIG. 5 is a diagram showing a trellis 10 used in the discussion that follows, in which the general case is described of the solution of a Viterbi algorithm. In the trellis each node represents a distinct state at a given time. The horizontal axis represents time t, which can be seen to be divided into T discrete intervals: 0, 1, 2, . . . T-1, while the vertical axis represents N states k: 0, 1, 2, . . . N-1. From time unit to time unit the system may transition from a given state k, to any other state, including itself (remains in the same state). For any particular state-to-state transition in any particular time interval there is a prescribed distance. This distance varies for each execution of the algorithm, i.e., the distance between a given state at an interval initial time to another given state at that interval end time may change from time interval to time interval. The algorithm attempts to find the shortest path from time t=0 to time t=T-1. Alternatively, it may find the maximum path if negative numbers are used.

Distance traversed along a path is accumulated, so that in any given pass of the algorithm it deals with only the state i at the present time t+1, and the previous state j at the previous time t, as shown in the figure by enclosing box 12. Box 12a is a representation of box 12 for the special case in which N is four (to simplify explanation), showing all possible paths from every state j at time t to every state i at time t+1. Each path from one state in j to another state in i has its own associated length. The algorithm looks at all such paths and determines which results in the shortest path to that state from time t=0, i.e., minimum accumulated distance. This can be expressed by the code shown in Appendix 1. This code implements what is sometimes referred to as the "forward pass" through the trellis, in a first implementation that computes the states in the minimum path.

Referring now to Appendix 1, the variables N, T, t, i and j are as discussed above in connection with the trellis shown in FIG. 4. Other variables are defined as set forth in Appendix 1. Thus, old_acc_dist[i] is the old accumulated distance at state i. In other words, referring briefly now to FIG. 5, the variable old_acc_dist[i] is the shortest distance at time t to state j accumulated thus far in the computations. Likewise, new_acc_dist[j] is the new accumulated distance computed for state i at time t+1, and so on. These definitions will become clearer after an analysis of the program in Appendix 1, which will now be presented.

As an initial matter, the "language", or format, of the code in the program of Appendix 1 is a pseudo-code. One type of construct in this code is FOR-loop construct of instructions, or operations, comprising the FOR statement and the NEXT statement. The FOR statement FOR n=x TO y means the instructions following, up to the NEXT statement NEXT n are performed iteratively counting up, starting with the variable n having the value x, and proceeding, integer by integer counting up, through the variable n having the value y. This FOR-loop construct can be nested with other such constructs of the same type, which is, in fact, the case in the program shown in Appendix 1. See, for example, the FOR-loop construct at lines 1 and 20. See also the FOR-loop construct at lines 2 and 19 nested within the FOR-loop construct at lines 1 and 20. And see the FOR-loop construct at lines 5 and 11 nested within the FOR-loop construct at lines 5 and 11. Such nested FOR-loop constructs are thus very similar to DO loops in the FORTRAN computer language. Note that the terms "instruction" and "operation" are used interchangeably herein, and refer to any instruction or operation performed in a microprocessor.

Another type of construct is the conditional operation, or execution, composed of the IF-THEN statement and the ENDIF statement. The IF-THEN statement IF x THEN y means that a Boolean operation, x, is performed, and if the result of the Boolean operation is TRUE, then the operation or operations set forth in y is/are executed. Conversely, if the result of the Boolean operation is FALSE, then the operation or operations set forth in y is/are not executed. The ENDIF statement ENDIF signals the end of the y operations. See, for example, the conditional move instructions at lines 7 through 10 in Appendix 1.

With the foregoing understood, the Program in Appendix 1 can now be understood. The Program proceeds as follows. The set of instructions in the Program, in lines 2 through 19 are performed for every time increment t from time t=0 through time t=T-2 (lines 1, 20). The instructions in lines 3 through 15 are performed for each such time increment t, first, for each state i from state i=0 to state i=N-1 (lines 2, 16). The first such instruction is to set the variable tmp_prev_state to 0 (line 3). This means that it is assumed (arbitrarily, to get the computation started) that the minimum path to the present state i is from the previous state j equal to 0. Next, the variable tmp_new_acc is set to a value that is the result of the addition of the variable old_acc_dist[0] to the variable d[t][i][0] (line 4). This means that it is assumed (again arbitrarily, to get the computation started) that the minimum accumulated distance to the present state i is the distance from the previous state j equal to 0.

Now, the set of instructions in lines 6 through 10 are performed for each state j from j=1 to j=N-1 (lines 5, 11). The first such instruction is the addition of the new calculated distance from the presently set j to the presently set i to the old accumulated distance, and the setting of tmp_acc_dist to that sum value (line 6). The next instructions are the Conditional instruction pair in lines 7 through 10. First, a compare operation is performed to determine whether the accumulated distance value just calculated in line 6, tmp_acc_dist, is less than the previously determined (or, assumed at start-up) accumulated distance value, tmp_new_acc (line 7). If it is, then tmp_new_acc is set to the value tmp_acc_dist, in other words, that is the new minimum accumulated distance (line 8). Also, the variable tmp_prev_state, previously set to 0, is now set to the present value of j, since this state is presently the minimum path state (line 9). This is repeated for all possible previous states j from which the path could have been to the present state i (lines 5 and 11).

At the end of the calculations in lines 5 through 11 the actual minimum path state will be the value in tmp_prev_state, and the actual accumulated minimum distance will be the value in tmp_new_acc. So, these values are set in the respective variables for accumulating these actual values, namely, prev_state[t][i] and new_acc_dist[i] (lines 12 and 13).

All of the foregoing instructions, in lines 3 through 14, are repeated for all values of i, that is for all states at the present time (lines 2 and 16). After that, for all values of i (lines 17 and 19) the old accumulated distance variable old_acc-dist[i] is updated with the newly determined values for new_acc_dist[i] (line 18).

All of the foregoing instructions, in lines 2 through 19, are repeated for all values of t, that is for all time increments (lines 1 and 20). The program is then finished and all shortest paths from all initial states are determined.

It will be appreciated at this time that the frequently repeated instructions at lines 7 through 8 involve a Boolean operation, namely, a compare, that conditions whether two variable updates are to occur. The inventive features described above in connection with the hardware structure of the preferred embodiment permits the result of this Boolean operation to be stored immediately in a GPR, in this case registers P0- PN-1, where they are available immediately to condition these register updates in lines 8 and 9. It will be understood that in this context immediately means in the same microprocessor clock cycle.

Returning now to the set of Viterbi computations, once the forward pass is completed, the shortest pass may then be determined. This is done by executing code that implements what is sometimes referred to as the "backward pass" through the trellis. In the backward pass, the last state determined by the forward pass is selected, and then the path, i.e., the sequence of states, that led to that state is simply retraced through the trellis. Note that the forward pass executes a total of N*N*T times, while the backward pass executes only N times. Thus, the forward pass is more computationally intensive. Also note that the elements of the state sequences must at least be ceil(log2(N)) bits. This backward pass code is shown in Appendix 2.

In Appendix 2 the variables T and t are the same as in Appendix 1. New variables are state_sequence[t] and laststate, the former being the sequence of states in the shortest path, which are stored in concatenated arrangement in a word, or, if necessary, words, and the latter being the last state in the computational sequence, at time t, in the shortest path being operated on. This variable, last_state, is initialized to the final state that had the shortest accumulated path. Note that a new form of the Repeat Start instruction pair is used, the Repeat Reverse Start instruction.

The FOR-loop decrement construct, FOR n=x TO y STEP -1 means the instructions following, up to the NEXT statement NEXT n are performed iteratively counting down, starting with the variable n having the value x, and proceeding, integer by integer counting down, through the variable n having the value y.

The Program in Appendix 2, which is quite short, proceeds as follows. First, the final state value, last_state, is added to the state sequence value, state_sequence[t] (line 2). Then, the last_state variable is reset to the state that lead to it (line 3). These two instructions in lines 2 and 3 are performed for every time increment t from time t=T-1 through time t=O (lines 1, 4). At the end of the program, all of the states in the shortest path are accumulated in the value state_sequence[t].

A second implementation of the Viterbi decoder differs from the first implementation in the following ways. First, not all transitions from state to next state are possible. Effectively some of the state-to-state distances are infinite. Second, the number of possible transitions is typically a power of two. Usually these algorithms are binary: any state can only have been reached from one of two possible states. Finally, the number of states is usually a power of two, most commonly 8, 16, 32, or 64.

In a typical implementation of such a binary algorithm with N states the transition from a state j to a state i is limited by a specific formulation:
state i =k+m
   where k=0 to N/2-1
   where m=0 or N/2
May have been reached from j=(2* k)+p
   where k is the same as above
   where p=0 or 1
For example for state i=15, k=7 and m=8.

Thus state i=15 could have only been reached from state 14 ((2*7)+0) and 15 ((2*7)+1).

Note that some combination of k and m uniquely describes state i from 0 to N-1. Also note that some combination of k and p uniquely describes state j from 0 to N_1. Finally, notice here that rather than storing the entire state information the transition value p (whether it was the 2*k or the (2*k)+1 state that was the previous state) is simply stored.

Code implementing the forward pass of a conventional binary implementation of the algorithm is shown in Appendix 3. In Appendix 3 the variables N. T, t, i, j and prev_state[t][i], are the same as in Appendix 1. New variables are old_acc_dist[j], new_acc_dist[i], d[t][i][p], and tmp_acc-dist0. The variable old_acc_dist[i] is similar to the variable of the same name in Appendix 1. However, in Appendix 3 it represents the old accumulated distance at state j=k+p, in accordance with the immediately preceding discussion of binary algorithms. Similarly, the variable new_acc_dist[i]60 represents the new accumulated distance at state i=k+m, also in accordance with the immediately preceding tmp_acc_dist0 discussion of binary algorithms. And, the variables tmp_acc_dist0 and tmp_acc_dist1 represent the accumulated distance from state j=(2*k)+p, for p=0 and for p=1, respectively.

Certain notations in the Program in Appendix 3. Thus, a new form of conditional move instruction, the Conditional Alternative instruction IF x THEN y ELSE z means that a Boolean operation, x, is performed, and if the result of the Boolean operation is TRUE, then the operation or operations set forth in y is/are executed, and the operation or operations set forth in z is/are not executed. Conversely, if the result of the Boolean operation is FALSE, then the operation or operations set forth in y is/are not executed, and the operation or operations set forth in z is/are executed. Like the Conditional Start instruction, it has a corresponding Conditional End instruction, ENDIF, signaling the end of the alternative y or z instructions. Finally, the double equal sign symbol, ==, means "does equal". Thus, for example, in Appendix 3, program line 11, the statement "IF (p==1) THEN" means that if p does equal the value "1", then (do whatever the next statement says).

The Program in Appendix 3 proceeds similarly to the Program in Appendix 1. However, note that, e.g., in lines 5 and 6 accumulated distances added are from state 2*k+p for p=O and p=1, respectively, reflecting the limitation in the binary algorithm discussed hereinabove. Note that this makes the computations simpler, there being only two possible paths to a given state. Therefore, only a single compare is done for a given set of two such possible paths (line 7), and, depending on the result of the compare, one (line 12) or the other (line 14) of the distances is accumulated.

Note that in the Program in Appendix 3 it is possible to replace the variable prev_state[t][i] with the following bitvector (group of contiguous bits):
trans[t]; a word whose bits representing the transition value
   (p) for all states at time t
Also, note that the FOR loops will generate j's in the following order:

0, $N/2$, 1, $N/2+1$, . . . ,$N/2-1$, N-1

The statement prev_state[t][j]=2k+p can be replaced by two alternatives shown in Appendices 4 and 5. In either case one gets a bit-vector (contiguous group of bits) that looks like Appendix 6. A different looping structure could generate a different order of bits. This structure results from alternation between the bottom and the top of the trellis (m=0 and m=N/2). Note that a new notation appears in Appendix 4, namely the <<=n notation. This means shift left by n bit positions.

Continuing on in the description of the typical case, given that the code in Appendix 3, with either Appendix 4 or Appendix 5, is used to generate a transition array, the code shown in Appendix 7 can recreate the appropriate state sequence. Now, rather than using state numbers, the backtracking process uses transitions. Once the transition bits (p) are extracted they can be used to compute the last state ((2*k)+p).

Note, in connection with the code shown in Appendix 7 that, first, the forward pass takes N*T loops whereas the backward pass takes T loops. Thus, the forward pass is the more time consuming portion of the algorithm. This is because in the general case, e.g., the Program in Appendix 1, one had to compare to N states rather than just two. Also note in this connection that here, N*T bits rather than N*T words are required to store the information necessary to retrace the state. This is because a single bit can encode either one of the two possible transitions that could have occurred.

Thus, it can be seen that certain features play a significant role in the preferred embodiment. Thus, notice in the code shown in Appendices 3 and 4 that the inner loop consists of the following construct:

| GENERAL FORM | CODE IN APPENDIX 3,4 |
| --- | --- |
| A0 = S0 + D0 | App'x 3, line 5 |
| A1 = S1 + D1 | App'x 3, line 6 |

-continued

| GENERAL FORM | CODE IN APPENDIX 3,4 |
|---|---|
| P = (A1 < A0) | App'x 3, line 7 |
| TR <<= 1 | App'x 4, line 1 |
| TR \|= P (alternatively this can be TR += P) | App'x 4, line 2 |
| IF (P == 1) THEN | App'x 3, lines 11–15 |
|    A0 = A1 | |
| ENDIF | |

Appendix 5 the equivalent code is:

| GENERAL FORM | CODE IN APPENDIX 5 |
|---|---|
| IF (P == 1) THEN | lines 1–5 |
|    A0 = A1 | |
| ENDIF | |
| IF (P == 1) THEN | lines 7–9 |
|   set the vth bit from the right in trans[t] to 1 | |
| ENDIF | |

Also, the preferred embodiment utilizes advantageously the feature in a DSP of a register TR that can be shifted left. The transitions trans[t] are stored in register TR. In order to effect the storage by concatenation mentioned above, the existing values in a register are shifted left by the number of bits in the value to be concatenated. Then, a bitwise OR is performed on the register, with the value to be concatenated at the rightmost bit positions. The bitwise OR is symbolized by |.

In addition, two registers A1 and A0 are utilized that can store the results of summations. Also, a register P is utilized that can 1) store the Boolean (1/0) result of a compare of A0 and A1, and 2) be used as the condition on which to perform a conditional overwrite of A0 by A1. Also, in conjunction with the execution of the code shown in Appendix 4, the register P is utilized as a source operand to an arithmetic unit that either performs an add or a bitwise or operation to TR. Alternatively, register P is advantageously used, in connection with the code shown in Appendix 5, to condition an operation which can set a bit in TR.

In addition, the conditional move operations:

IF(cond) THEN x = y

ENDIF facilitate the selection of the minimum path as well as the generation of a transition in a non-binary Viterbi algorithm implementation, as will be described in more detail below.

Further, the above features can be realized in a single register file, where the registers can be source of the arithmetic units as described above.

As mentioned above, the application of the inventive method can be extended to the implementation of non-binary forms of the Viterbi algorithm. This is done by combining the Boolean results of several compares to form a value indicating which was the minimum path taken. For example, consider the comparison of four possible accumulated distances, A(n), namely, A0, A1, A2, A3:

$$P0 = A1 < A0$$

$$P2 = A3 < A2$$

IF (P0=1) THEN

A0 = A1

ENDIF

IF (P2=1) THEN

A2 = A3

ENDIF $$P1 = A2 < A0$$

IF (P1 = 1) THEN

A0 = A2

P0 = P2

ENDIF $$P = (P1 << 1) | P0$$

Alternatively this can be accomplished by:

IF (P1 = 1) THEN

P = P0 | 2

ENDIF or

IF (P1 = 1) THEN

P = P0 + 2

ENDIF

The result, P, would represent which one of the four paths were taken. Note that P is only a 2-bit result.

Although the present invention and its advantages have been described in detail, it should be understood that various changes, substitutions and alterations can be made herein without departing from the spirit and scope of the invention as defined by the appended claims.

APPENDIX 1

| VARIABLES: | |
|---|---|
| N | ; total number of discrete states, numbered from 0 to N-1 |
| T | ; total number of time units, numbered from 0 to T-1 |
| t | ; time |
| i | ; present state |
| j | ; previous state |
| old_acc_dist[j] | ; old accumulated distance at state j |

APPENDIX 1-continued

| | |
|---|---|
| new_acc_dist[i] | ; new accumulated distance at state i |
| d[t][i][j] | ; distance from state j at time t to state i at time t + 1 |
| prev_state[t][i] | ; the state from which state i at time t transitioned from, |
| | ; saved for recreation of path |
| tmp_acc_dist | ; accumulated distance |
| tmp_new_acc | ; minimum distance for present state (i) being looked at |
| tmp_prev_state | ; previous state at which minimum accumulated distance occurred |

PROGRAM:

```
FOR t = 0 TO T-2                                        ; for each time
    FOR i = 0 to N-1                                    ; for each state
        tmp_prev_state = 0                              ; assume minimum path is from previous state j = 0
        tmp_new_acc = old_acc_dist[0] + d[t][i][0]      ; assume minimum accumulated distance is from prevous state j = 0
        FOR j = 1 to N - 1                              ; test against other possible prevous states
            tmp_acc_dist = old_acc_dist[j] + d[t][i][j] ; add accumulated
            IF (tmp_acc_dist < tmp_new_acc) THEN        ; check if other state has lower accumulated distance
                tmp_new_acc = tmp_acc_dist              ; if so make this new minimum accumulated distance
                tmp_prev_state = j                      ; set this state as minimum path state
            ENDIF                                       ;
        NEXT j                                          ; next previous state
        prev_state[t][i] = tmp_prev_state               ; set the previous state determination to be the one with the
                                                          minimum distance
        new_acc_dist[i] = tmp_new_acc                   ; new accumulated distance is set to the the minimum distance
                                                          found
    NEXT i                                              ; next state
    FOR i = 0 to N-1                                    ; for each state
        old_acc_dist[i] = new_acc_dist[i]               ; update distances
    NEXT i                                              ; next state
NEXT t                                                  ; next time
```

APPENDIX 2

VARIABLES:

| | |
|---|---|
| T | ; total number of time units, numbered from 0 to T-1 |
| state_sequence[t] | ; the sequence of states in shortest path, stored in a word, or words |
| last_state | ; initialized to the the final state (that had the shortest accumulated path) |
| t | ; time |

PROGRAM:

```
FOR t = T - 1 to 0 STEP - 1                             ; for each time interval
    state_sequence[t] = last_state                      ; add final state to state sequence
    last_state = prev_state[t - 1][last_state]          ; reset last state to the state that lead to it
NEXT t                                                  ; next time interval
```

APPENDIX 3

VARIABLES:

| | |
|---|---|
| M | ; number of possible previous states |
| N | ; total number of discrete states, numbered from 0 to N-1 |
| T | ; total number of time units, numbered from 0 to T-1 |
| t | ; time |
| i | ; present state |
| j | ; previous state |
| old_acc_dist[j] | ; old accccumulated distance at state j = k + p |
| new_acc_dist[i] | ; new accumulated distance at state i = k + m |
| d[t][i][p] | ; distance from state i = k + m at time t to state j = k + p at time t + 1 |
| | ; Note that p (2 choices) rather than j (N choices) are needed for previous states |
| | ; as compared to Example 1 |
| prev_state[t][i] | ; the state from which state i at time t transitioned from, |
| | ; saved for recreation of path, stored as words |
| | ; two possible accumulated distances for a given state |
| tmp_acc_dist0 | ; accumulated distance from state j = (2*k) + p for p = 0 |
| tmp_acc_dist1 | ; accumulated distance from state j = (2*k) + p for p = 1 |

PROGRAM

```
FOR t = 0 TO T-2                                        ; for each time
    FOR k = 0 TO N/2 - 1                                ; \ for each state i
        FOR m = 0 to N/2 STEP N/2                       ; /
            i = k + m
            tmp_acc_dist0 = old_acc_dist[(2*k) + 0] + d[t][i][0]  ; add accumulated distances from state 2*k + p for p = 0
            tmp_acc_dist1 = old_acc_dist[(2*k) + 1] + d[t][i][1]  ; add accumulated distances from state 2*k + p for p = 1
            p = tmp_acc_dist1 < tmp_acc_dist0           ; \ boolean value true (= 1) if p = 1 state has lower
```

APPENDIX 3-continued

```
            prev_state[t][i] = 2*k + p           ; | accumulated minimum distance -- boolean value false
            IF (p == 1) THEN                     ; / (= 0) if p = 0 state otherwise
                new_acc_dist[i] = tmp_acc_dist1  ; prev_state[t][j], still using a whole word
            ELSE                                 ; \
                new_acc_dist[i] = tmp_acc_dist0  ; \
            ENDIF                                ;   > new accumulated distance is set to the the minimum
        NEXT m                                   ;  / found
    NEXT k                                       ; /
    FOR i = 0 to N-1                             ; \ next state
        old_acc_dist[i] = new_acc_dist[i]        ; /
    NEXT i                                       ; for each state
NEXT t                                           ; update distances
                                                 ; next state
                                                 ; next time
```

APPENDIX 4

```
1   trans[t] <<= 1      ; shift trans[t] left by one bit position
2   trans[t] |= p       ; set the least order bit of trans[t] to p
```

APPENDIX 5

```
 1  IF (m == N/2) THEN
 2      q = 1
 3  ELSE
 4      q = 0
 5  ENDIF
 6  r = (2 * k) + q
 7  IF (p == 1)
 8      set the rth bit from the right in trans[t] to 1, where the right-most
 9      bit is the 0th bit
10  ENDIF
```

APPENDIX 6

| p for state 0 | p for state N/2 | p for state 1 | p for state N/2 + 1 | . . . | p for state N/2 − 1 | p for state N − 1 |

MSB                                                                                                    LSB
Most Significant Bit                                                                    Least Significant Bit

APPENDIX 7

```
VARIABLES:

T                       ; total number of time units, numbered from 0 to T-1
state_sequence[t]       ; the sequence of states in shortest path
last_state              ; initialized to the the final state (which had the shortest accumulated path)
trans[t]                ; a sequence of T N-bit words which store 0 or 1 at each position,
                        ; representing what path wash shortest to get to that state for that time t.
t                       ; time
PROGRAM:

FOR t = T − 1 to 0 STEP − 1                ; for each time interval
    state_sequence[t] = last_state         ; add final state to state sequence
                                           ; k, q, r used to compute transition bit for last state
    IF (last_state >= N/2) THEN
        q = 1
        k = last_state − N/2
    ELSE
        q = 0
        k = last_state
    ENDIF
    r = (2 * k) + q
    p = (trans[t − 1] >> (N − 1 − r)) & 1  ; extract rth bit from right:
                                           ;    - right shift by (N-1) -r
                                           ;    - mask off via and all bits but least significant
    last_state = 2 * k + p                 ; reset last state to the state that lead to it
                                           ; next time interval
NEXT t
```

What is claimed is:

1. A microprocessor, comprising:

a plurality of general purpose registers;

an arithmetic logic unit, capable of performing arithmetic operations and comparison operations, having a first input and a second input, and having an output, said first and said second inputs receiving values stored in said general purpose registers, and said output storing the results of said arithmetic logic unit operations in said general purpose registers; and at least one of said general purpose registers being capable of receiving directly from said arithmetic logic unit the result of a comparison operation;

wherein said at least one of said general purpose registers capable of receiving directly from said arithmetic logic unit a result of a comparison operation is configured so as to cause the conditioning of an arithmetic operation of said arithmetic logic unit based on the value stored in said general purpose register.

2. A microprocessor according to claim 1, further comprising one or more additional arithmetic logic units, capable of performing arithmetic operations and comparison operations, having a first input and a second input, and having an output, said first and said second inputs receiving values stored in said general purpose registers, and said output storing the results of said arithmetic logic unit operations in said general purpose registers; and at least one of said general purpose registers being capable of receiving directly from said one or more arithmetic logic unit a Boolean value resulting from a comparison operation.

3. A microprocessor according to claim 2, wherein said at least one of said general purpose registers capable of receiving directly from said at least one of said arithmetic logic units a result of a Boolean operation being configured so as to cause the conditioning of an arithmetic operation of said arithmetic logic unit based on the value stored in said general purpose register.

4. A method for performing a plurality of operations in a microprocessor, said microprocessor including an arithmetic logic unit and a plurality of general purpose registers and performing one or more operations in each of a series of clock cycles, said operations comprising one or more arithmetic operations and comprising one or more comparison operations, at least one of said arithmetic operations being conditioned on the result of a comparison operation previously performed, comprising the steps of:

performing a comparison operation in said arithmetic logic unit, and obtaining thereby a Boolean value representing the result of said comparison operation;

storing said Boolean value in a first general purpose register in the same clock cycle as that in which said comparison operation is performed; and thereafter, performing an arithmetic operation in said arithmetic logic unit and storing the result of said arithmetic operation in a second general purpose register, however, said step of performing being conditioned on the Boolean value stored in said first general purpose register.

5. A method according to claim 4, wherein said conditioning of said step of performing and storing is effected by selectively performing said arithmetic operation, depending on the value of said Boolean value.

6. A method according to claim 4, wherein said conditioning of said step of performing and storing is effected by selectively storing the result of said arithmetic operation, depending on the value of said Boolean value.

* * * * *